US007607668B2

(12) United States Patent
Dugandzic et al.

(10) Patent No.: US 7,607,668 B2
(45) Date of Patent: Oct. 27, 2009

(54) CASTER-CAMBER PLATE ASSEMBLIES

(75) Inventors: Luka Dugandzic, San Luis Obispo, CA (US); Charles Glenn Schwynoch, San Luis Obispo, CA (US); John David Fabry, San Luis Obispo, CA (US); Michael Alan Smith, Los Osos, CA (US)

(73) Assignee: Maximum Motorsports, San Luis Obispo, CA (US)

( * ) Notice: Subject to any disclaimer, the term of this patent is extended or adjusted under 35 U.S.C. 154(b) by 157 days.

(21) Appl. No.: 11/811,317

(22) Filed: Jun. 8, 2007

(65) Prior Publication Data
US 2008/0303233 A1 Dec. 11, 2008

(51) Int. Cl.
*B62D 17/00* (2006.01)
(52) U.S. Cl. .................. 280/86.752; 280/124.155; 280/124.147
(58) Field of Classification Search ............. 280/86.752, 280/86.751, 86.575, 124.155, 124.147
See application file for complete search history.

(56) References Cited
U.S. PATENT DOCUMENTS

| | | | |
|---|---|---|---|
| 4,372,575 A | 2/1983 | Hyma | |
| 4,817,984 A * | 4/1989 | Ferman et al. .......... | 280/86.752 |
| 4,946,188 A | 8/1990 | Key et al. | |
| 5,484,161 A | 1/1996 | McIntyre | |
| D371,334 S | 7/1996 | Hotchkis, Jr. et al. | |
| 5,931,485 A | 8/1999 | Modinger et al. | |
| 6,224,075 B1 | 5/2001 | McIntyre | |
| 6,257,601 B1 | 7/2001 | Spears et al. | |
| 6,328,321 B1 | 12/2001 | Nolan | |
| D494,894 S | 8/2004 | Carlson | |
| 6,796,569 B2 | 9/2004 | Pankau | |
| 7,052,024 B2 | 5/2006 | Jung | |
| 7,144,021 B2 | 12/2006 | Carlson | |
| 7,163,215 B2 | 1/2007 | Mathis et al. | |
| 7,210,693 B2 | 5/2007 | Ingalls et al. | |

FOREIGN PATENT DOCUMENTS

JP      2003-300407 A   * 10/2003
JP      2006-347521 A   * 12/2006

* cited by examiner

*Primary Examiner*—Ruth Ilan
*Assistant Examiner*—Keith Frisby
(74) *Attorney, Agent, or Firm*—David O. Simmons

(57) ABSTRACT

A caster-camber plate assembly has a fastener plate including fastening members. A lower adjustment plate has a first side face positioned adjacent a first side face of the fastener plate such that fastening members of the fastening plate extend therethrough. The lower adjustment plate is moveable with respect to the fastener plate along first and second translation axes. An upper adjustment plate has a first side face thereof positioned adjacent a second side face of the lower adjustment plate with the fastening members extending therethrough. The upper adjustment plate and the lower adjustment plate are jointly configured for allowing the upper adjustment plate to be moveable with respect to the fastener plate along the second translation axis. A plate interlocking structure accommodates relative movement between the adjustment plates along the first translation axis and effectively inhibits relative movement between the adjustment plates along the second translation axis.

17 Claims, 4 Drawing Sheets

CASTER-CAMBER PLATE ASSEMBLIES

FIELD OF THE DISCLOSURE

The disclosures made herein relate generally to automobile suspensions and more particularly to suspension components that allow camber and/or caster to be selectively adjusted.

BACKGROUND OF THE DISCLOSURE

Many automobiles have a front suspension using a MacPherson strut arrangement or similar type of strut arrangement. In such a strut arrangement, a top mounting point of a strut is attached to an upper strut mounting assembly. The upper strut mounting assembly is attached to a strut tower of the automobile. The strut tower is a portion of the chassis of the automobile. Loads exerted on the front suspension are transmitted from a front suspension assembly, such as a control arm and a strut, to the chassis via the upper strut mounting assembly.

Factory upper strut mounting assemblies suitably attached to the strut tower often allow camber of the front suspension to be adjusted, but not caster. One arrangement for allowing camber to be adjusted is to provide slots in the strut tower and to mount the upper strut mounting assemblies to the strut towers via fasteners extending through the corresponding slots. Moving the upper strut mounting assemblies relative to the corresponding slots facilitates adjustments in camber. However, the range of adjustment for camber afforded by the slots is often insufficient for achieving desired or preferred camber settings on a lowered vehicle or a vehicle with a modified front suspension.

A caster-camber plate assembly is an example of an upper strut mounting assembly. The caster-camber plate assembly permits the caster and the camber to be adjusted. Some caster-camber plate assemblies allow the caster and camber to be independently adjusted from each other, while others permit camber and caster to be adjusted jointly. Desired or at least preferred front suspension alignment setting can be better achieved by enabling the caster and camber to be adjusted. Also, caster-camber plate assemblies, such as those disclosed in accordance with the present invention, generally provide for greater adjustment of caster and/or camber than do factory upper strut mounting assemblies.

A caster-camber plate assembly having a conventional construction suffers from one or more drawbacks. A caster camber plate assembly having a conventional construction is referred to herein as a conventional caster-camber plate assembly. Conventional caster-camber plates are commercially available from a variety of manufacturers and distributors such as, for example, Steeda Autosports, Griggs Racing and Brothers Performance. Examples of drawbacks associated with a conventional caster-camber plate assemblies include, but are not limited to, less than optimal strength of one or more caster-camber plate assembly components, little or no caster adjustability, limited clearance for a coil-over upper spring perch, incompatibility with original equipment spring isolators, incompatibility with original equipment dust boots, dependent caster and camber adjustment and complexity of installation. These limitations reduce the reliability, effectiveness and/or versatility of a conventional caster-camber plate assembly.

Accordingly, a caster-camber plate assembly capable of overcoming one or more of these drawbacks would be advantageous, desirable and useful.

SUMMARY OF THE DISCLOSURE

Embodiments of the present invention provide advantageous function with respect to conventional strut top mounting assemblies such as caster-camber plate assemblies. More specifically, embodiments of the present invention offer the advantageous capabilities of enhanced strength of one or more caster-camber plate assembly components, compatibility with stock springs; allowing caster adjustability, offering original equipment amount of clearance for a coil-over upper spring perch, being compatible with original equipment spring isolators, being compatible with original equipment dust boots, offering independent caster and camber adjustability, and exhibiting relatively simple installation. In doing so, embodiments of the present invention enhance reliability, effectiveness and/or versatility with respect to conventional suspension components that allow caster and/or camber to be selectively adjusted.

In one embodiment of the present invention, a caster-camber plate assembly comprises a fastener plate, a lower adjustment plate, a first plate interlocking structure, an upper adjustment plate and a second plate interlocking structure. The fastener plate includes a plurality of fastening members fixedly engaged therewith and extending from a first side face thereof. The lower adjustment plate has a first side face thereof positioned adjacent the first side face of the fastener plate such that the fastening members extend through the first adjustment plate. The lower adjustment plate is moveable with respect to the fastener plate along a first translation axis and a second translation axis. The second translation axis extends in a substantially non-parallel manner with respect to the first translation axis. The first plate interlocking structure is integral with the lower adjustment plate. The upper adjustment plate has a first side face thereof positioned adjacent a second side face of the lower adjustment plate such that the fastening members extend therethrough. The upper adjustment plate and the lower adjustment plate are jointly configured for allowing the upper adjustment plate to be moveable with respect to the fastener plate along the second translation axis. The second plate interlocking structure is integral with the upper adjustment plate. The second plate interlocking structure engages the first plate interlocking structure for allowing relative movement between the adjustment plates along the first translation axis and for effectively inhibiting relative movement between the adjustment plates along the second translation axis.

In another embodiment of the present invention, a caster-camber plate assembly comprises a fastener plate, a lower adjustment plate, a bearing cup body, an upper adjustment plate, and a support member. The fastener plate includes a plurality of chassis fastening members fixedly engaged therewith and extending from a first side face thereof. The lower adjustment plate has a first side face thereof positioned adjacent the side face of the fastener plate such that said chassis fastening members extend therethrough. The lower adjustment plate is moveable with respect to the fastener plate along a first translation axis and a second translation axis. The second translation axis extends substantially perpendicular to the first translation axis. The bearing cup body is fixedly engaged with the lower adjustment plate. A shoulder of the bearing cup body protrudes above a second side face of the lower adjustment plate. The upper adjustment plate has a first side face thereof positioned adjacent the second side face of the lower adjustment plate such that said chassis fastening members extend therethrough. The upper adjustment plate is effectively constrained to movement with respect to the fastener plate along the second translation axis. The upper adjustment plate and the lower adjustment plate are jointly configured for allowing the upper adjustment plate to be moveable with respect to the fastener plate along the second translation axis. The upper adjustment plate includes an elongated aperture extending therethrough. The protruding portion of the bearing cup body is constrained between opposing edge portions of the elongated aperture for allowing relative movement between the adjustment plates along the first translation axis and for effectively inhibiting relative movement between the adjustment plates along the second translation axis. The upper adjustment plate includes an upper adjustment plate fastening member integral therewith and extending from a second side face thereof. The upper adjustment plate fastening member is integral with and extends from a second side face of the upper adjustment plate. The support member is engaged between the upper adjustment plate fastening member and at least one of said chassis fastening members.

In another embodiment of the present invention, a caster-camber plate assembly kit comprises a fastener plate, a lower adjustment plate, a bearing cup body and an upper adjustment plate. The fastener plate includes a plurality of chassis fastening members fixedly engaged therewith and extending from a first side face thereof. The lower adjustment plate has a first side face thereof configured for being positioned adjacent the side face of the fastener plate such that said chassis fastening members extend therethrough when the first side face of the lower adjustment plate is positioned adjacent the side face of the fastener plate. The lower adjustment plate is configured for being moveable with respect to the fastener plate along a first translation axis and a second translation axis when positioned adjacent the side face of the fastener plate with said chassis fastening members extending therethrough. The second translation axis extends in a non-parallel manner with respect to the first translation axis. The bearing cup body is fixedly engagable with or fixedly engaged with the lower adjustment plate. A shoulder of the bearing cup body protrudes above a second side face of the lower adjustment plate, when the bearing cup body is fixedly engaged with the lower adjustment plate. The upper adjustment plate has a first side face thereof configured for being positioned adjacent the second side face of the lower adjustment plate and for having said chassis fastening members extending therethrough when the first side face of the upper adjustment plate is positioned adjacent the second side face of the lower adjustment plate. The upper adjustment plate is effectively constrained to movement with respect to the fastener plate along the second translation axis when the first side face of the upper adjustment plate is positioned adjacent the second side face of the lower adjustment plate. The upper adjustment plate and the lower adjustment plate are jointly configured for allowing the upper adjustment plate to be moveable with respect to the fastener plate along the second translation axis. The upper adjustment plate includes an elongated aperture. The protruding portion of the bearing cup body and opposing edge portions of the elongated aperture are jointly configured for constraining the protruding portion of the bearing cup body between the opposing edge portions of the elongated aperture for allowing relative movement between the adjustment plates along the first translation axis and for effectively inhibiting relative movement between the adjustment plates along the second translation axis. Accordingly, it is disclosed herein that a caster-camber plate assembly in accordance with the present invention can be offered in kit form whereby at least a portion of the various caster-camber plate assembly components are offered in a disassembled manner that require assembly by an installer (e.g. professional installer, vehicle owner, etc).

These and other objects, embodiments, advantages and/or distinctions of the present invention will become readily apparent upon further review of the following specification, associated drawings and appended claims.

DETAILED DESCRIPTION

Figure 1:
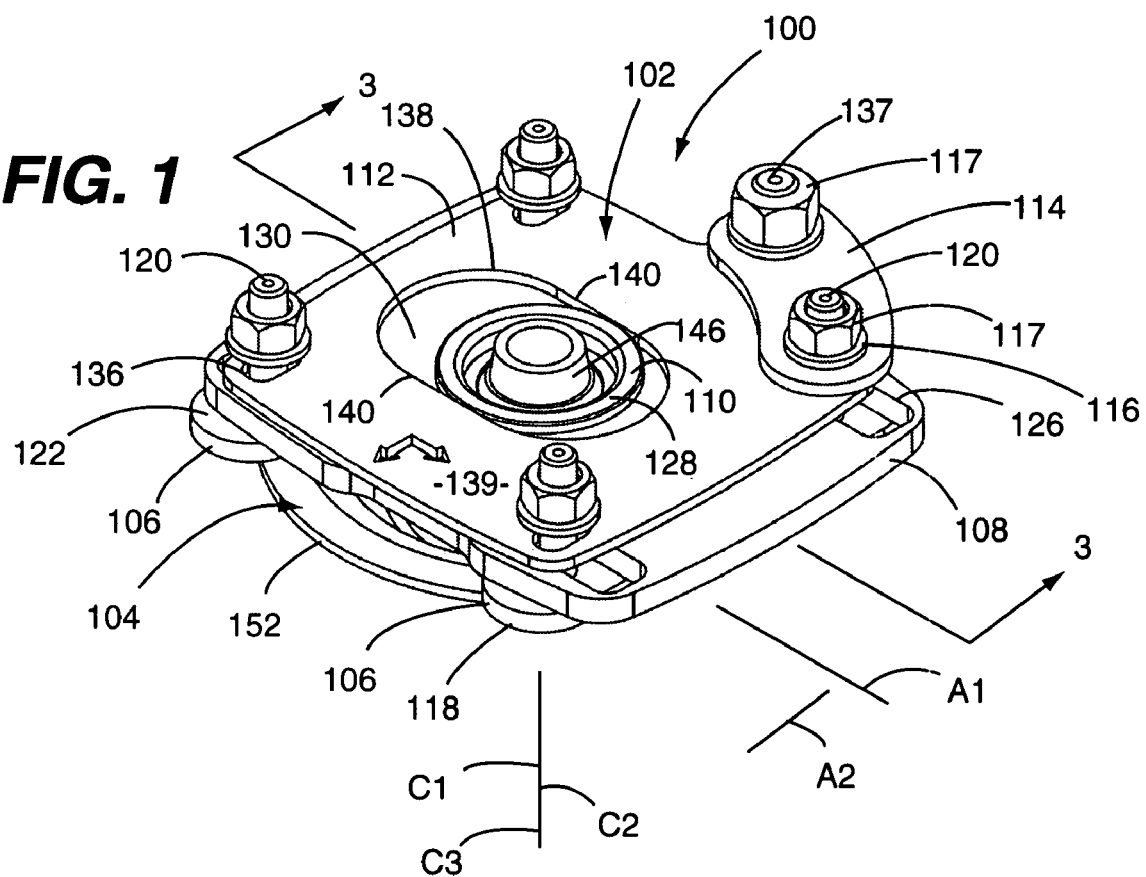
FIG. 1 is a top perspective view of an embodiment of a caster-camber plate assembly in accordance with the present invention.
Figure 2:
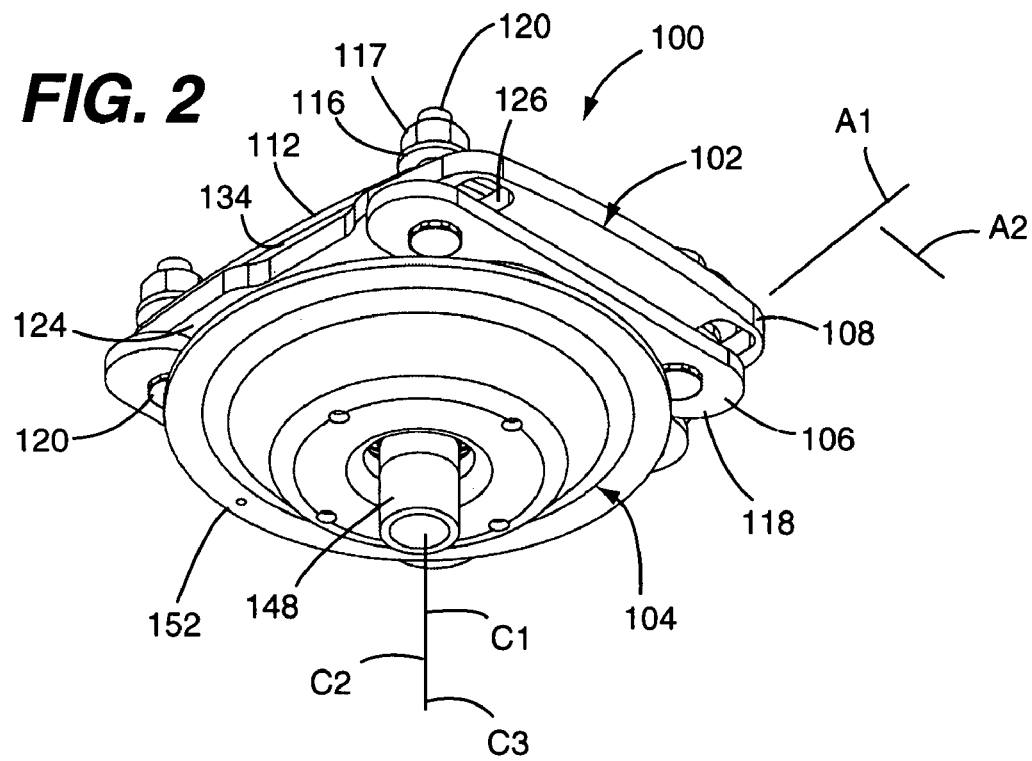
FIG. 2 is a bottom perspective view of the caster-camber plate assembly shown in FIG. 1.
Figure 3:
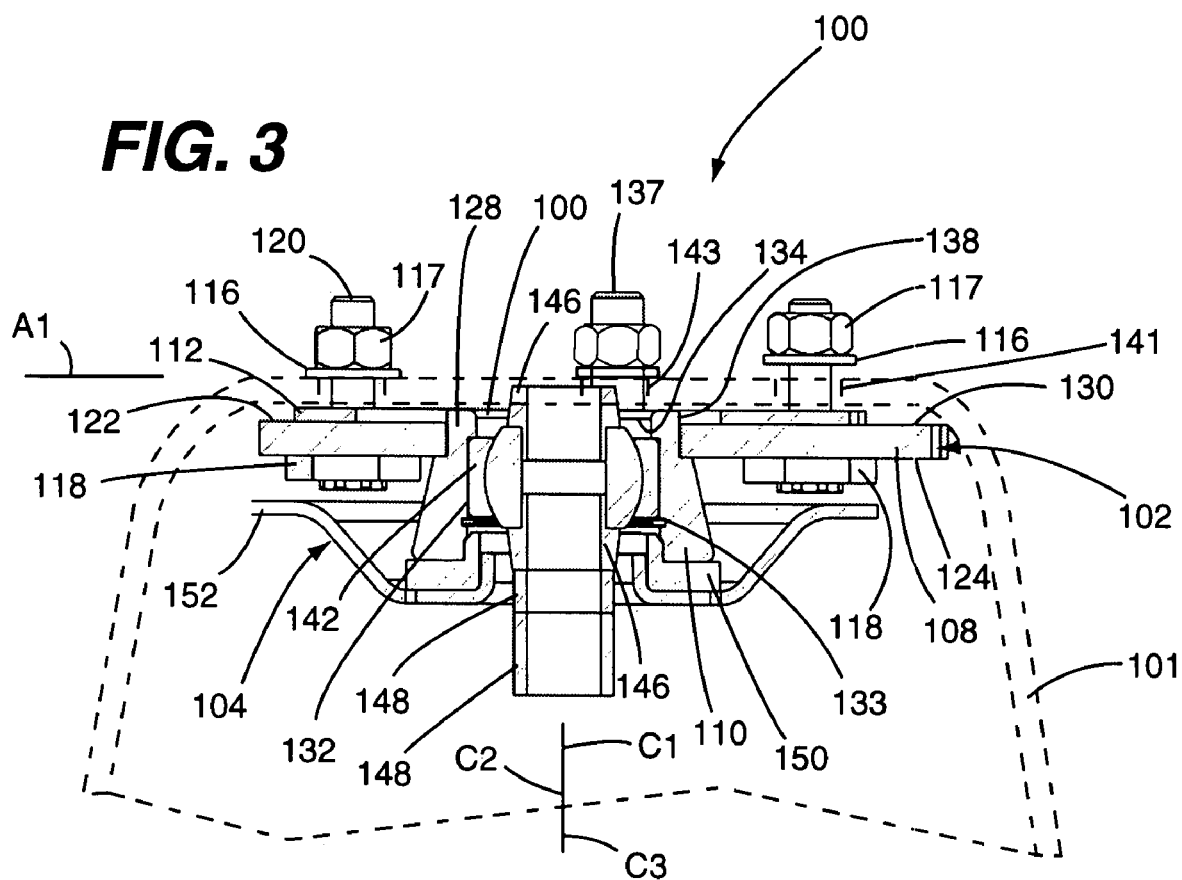
FIG. 3 is a cross-sectional view taken along the line 3-3 in FIG. 1.

FIGS. 1-4 show an embodiment of a caster-camber plate assembly 100, which is in accordance with the present invention. The caster-camber plate assembly 100 as shown is specifically configured for use with a S197 FORD™ MUSTANG™ chassis strut towers (e.g., the chassis strut tower 101, which is shown in FIG. 3). However, the present invention is not unnecessarily limited to any particular vehicle application or chassis. Ford and Mustang are both the registered trademarks of Ford Motor Company having headquarters located in Detroit, Mich.

The caster-camber plate assembly 100 includes a plate component group 102 and a spring perch component group 104. The plate component group 102 is configured for being attached to a chassis of a vehicle. The spring perch component group 104 is configured for being engaged between the plate component group 102 and a coil spring-strut assembly (not shown) of the vehicle. As will be discussed below in greater detail, the plate component group 102 is further configured for advantageously facilitating adjustment of caster and/or camber of the coil spring-strut assembly.

The plate component group 102 includes fastener plates 106, a camber plate 108, a bearing cup body 110, a caster plate 112, a support member 114 and associated fastening hardware (i.e., washers 116 and nuts 117). Each one of the fastener plates 106 includes a back-up plate 118 and threaded studs 120 fixedly engaged with the back-up plate 118 and extending from a first side face 122 of the back-up plate 118. In one embodiment, the threaded studs 120 extend through holes in the back-up plate 118 (e.g., are pressed or screwed into place). It is disclosed herein that bolts engaging mating threads in the back-up plate 118 can be used in place of the threaded studs 120. Accordingly, the bolts would extend from the first side face 122 of the back-up plate 118. Two fastening plates 106 are shown. However, it is disclosed herein that one fastening plate or more than two fastening plates may be implemented. Thus, the present invention is not unnecessarily limited to a particular number of fastening plates or number of fasteners per fastener plate.

The camber plate 108, which is an embodiment of a lower adjustment plate in accordance with the present invention, has a first side face 124 positioned adjacent the first side face 122 of each back-up plate 118 (i.e., a first side face 124 of the fastener plate 106) such that the threaded studs 120 (i.e., fastening members) extend through slots 126 of the camber plate 108. It is disclosed herein that the threaded studs 120 may be pressed into mating apertures, welded in place or the like. Width and length dimensions of the slots 126 are configured such that the camber plate 108 is moveable with respect to the back-up plates 118 along a first translation axis A1 and a second translation axis A2. The second translation axis A2 extends substantially perpendicular (i.e., substantially non-parallel) with respect to the first translation axis A1.

The bearing cup body 110 is fixedly engaged with the camber plate 108. Examples of approaches for fixedly engaging the bearing cup body 110 with the camber plate 108 include, but are not limited to, interference press fit, welding, threaded interface, discrete mechanical fastener(s) and the like. A shoulder 128 (i.e., protruding portion) of the bearing cup body 110 protrudes above a second side face 130 of the camber plate 108. The bearing cup body 110 includes a bearing pocket 132 configured for receiving a bearing and a retention device groove 133 (i.e., retention feature) configured for receiving a retention device 131 (e.g., spiro-lok, c-clip, etc) therein for securing the bearing fixedly within the bearing pocket 132.

An elongated aperture 138 extends through the caster plate 112. The dimensions of the elongated aperture 138 and the shoulder 128 of the bearing cup body 110 are jointly configured such that the shoulder 128 is constrained between opposing edge portions 140 of the elongated aperture 138. This constraint allows relative movement between the plates 108, 112 along the first translation axis A1 and effectively inhibits relative movement between the plates 108, 112 along the second translation axis A2. The shoulder 128 of the bearing cup body 110 is an embodiment of a first plate interlocking structure and the elongated aperture 138 of the caster plate 112 is an embodiment of a second interlocking structure. Jointly, such interlocking structures provide constrained movement of the caster plate 112 relative to the camber plate 108.

Figure 4:
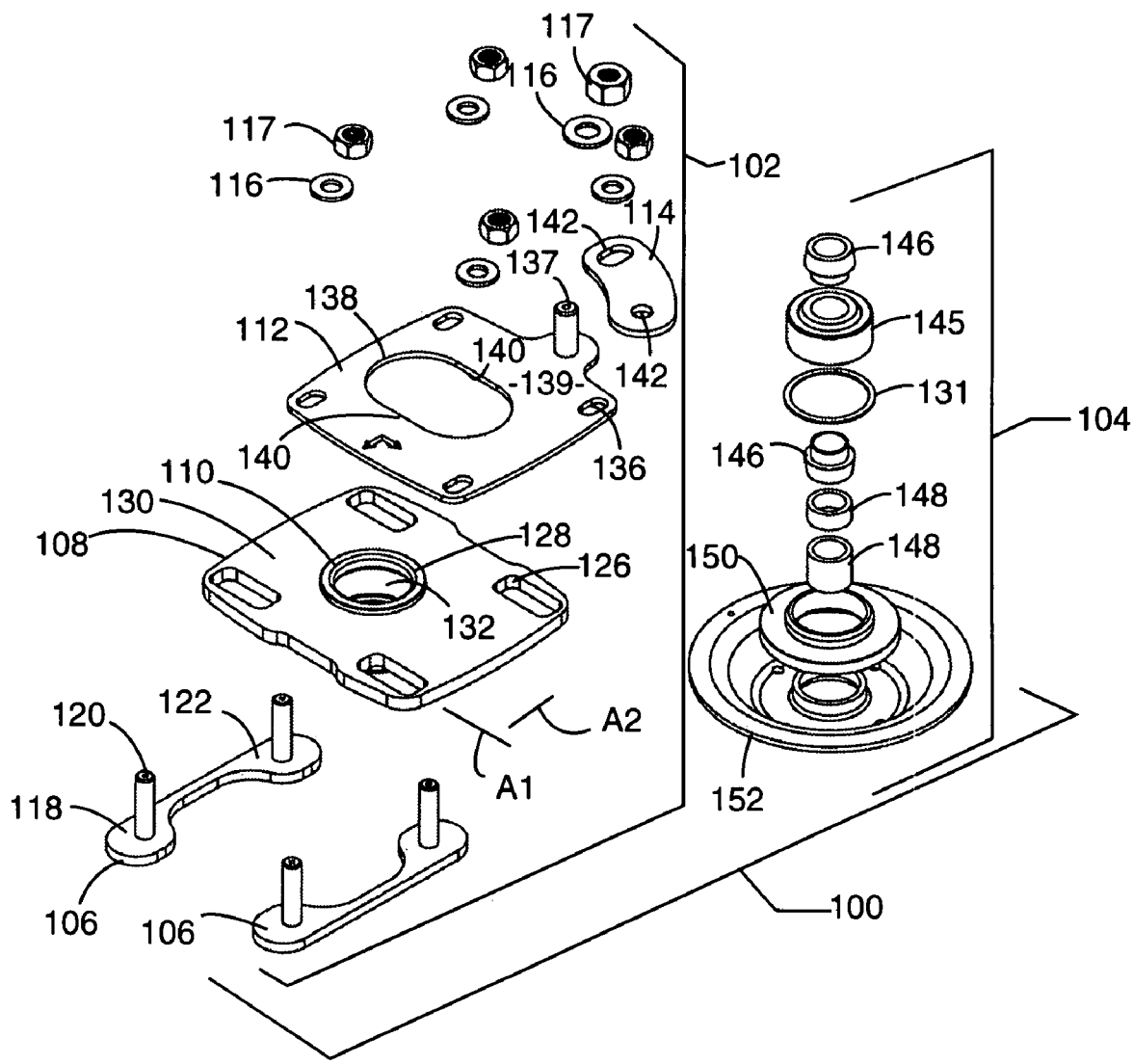
FIG. 4 is an exploded view of the caster-camber plate assembly shown in FIG. 1.

The caster plate 112, which is an embodiment of an upper adjustment plate in accordance with the present invention, has a first side face 134 (FIGS. 2 and 3) positioned adjacent the second side face 130 of the lower adjustment plate 108 such that the threaded studs 120 extend through slots 136 of the caster plate 112 (FIGS. 1, 3 and 4). In this manner, the threaded studs 120 extend through the camber plate 108 and the caster plate 112. Width and length dimensions of the slots 136 are configured such that the caster plate 112 is effectively constrained to movement with respect to the back-up plates 118 along the second translation axis A2. Furthermore, the width of each one of the slots 126 of the camber plate 108 is configured for accommodating translation of the caster plate 112 with respect to the threaded studs 120 along the second translation axis A2. More specifically, in view of relative interface between the bearing cup body 110 and the elongated aperture 138 of the caster plate 112 inhibiting movement between the camber plate 108 and the caster plate 112, the width of the slots 126 of the camber plate 108 must be substantially greater than the diameter of the threaded studs 120 in order to allow translation of the caster plate 112 along the second translation axis A2. Thus, the slots 126 of the camber plate 108 and the slots 136 of the caster plate 112 are jointly configured for allowing the caster plate 112 to be moveable with respect to the back-up plates 118 along the second translation axis A2. Aside from any other limiting factors, the length of the slots 136 of the caster plate 112 and the width of the slots 126 in the camber plates 108 determine the degree of translation of the plates 108, 112 relative to the threaded studs 120 along the second translation axis A2. In one embodiment, the width of each one of the slots 126 of the camber plate 108 is approximately equal to an effective travel length of the slots 136 of the caster plate 112.

A caster plate fastening stud 137 is integral with the caster plate 112. The caster plate fastening stud 137 extends from a second side face 139 of the caster plate 112. The caster plate fastening stud 137 extends through a slotted aperture 143 in the chassis strut tower 101. As will be discussed below, the caster plate fastening stud 137 is used for securing the caster plate 112 in place relative to the chassis strut tower 101, thereby allowing a camber setting to be adjusted independent of and without affecting the caster setting. The caster plate fastening stud 137 is one example of a caster plate fastening member. It is disclosed herein that a bolt or other type of fastener could be used in place of the caster plate fastening stud 137 and mating nut 117 (e.g., a bolt that engages mating threads in the caster plate 112). It is also disclosed herein that the threaded studs 120 and mating nut 117 can be replaced with bolts or the like (e.g., bolts threaded into threads of the fastener plates 106, into nuts attached to the fastener plates 106, etc).

In use, the threaded studs 120 extend through respective apertures 141 (FIG. 3) in the chassis strut tower 101. Through sufficient tightening of the nuts 117, the camber plate 108 and the caster plate 112 are drawn into fixed engagement between the chassis strut tower 101 and the back-up plates 118 thereby precluding relative movement between the caster-camber plate assembly 100 and the chassis strut tower 101. As shown in FIGS. 1-3, in many applications (e.g., the S197 FORD™ MUSTANG™ chassis), the strut tower apertures 137 are clearance thru-holes as opposed to slots such that neither caster nor camber is substantially adjustable for achieving non-factory settings. Advantageously, the caster-camber plate assemblies 100 are configured for allowing independent adjustment of caster and camber.

Figure 5:
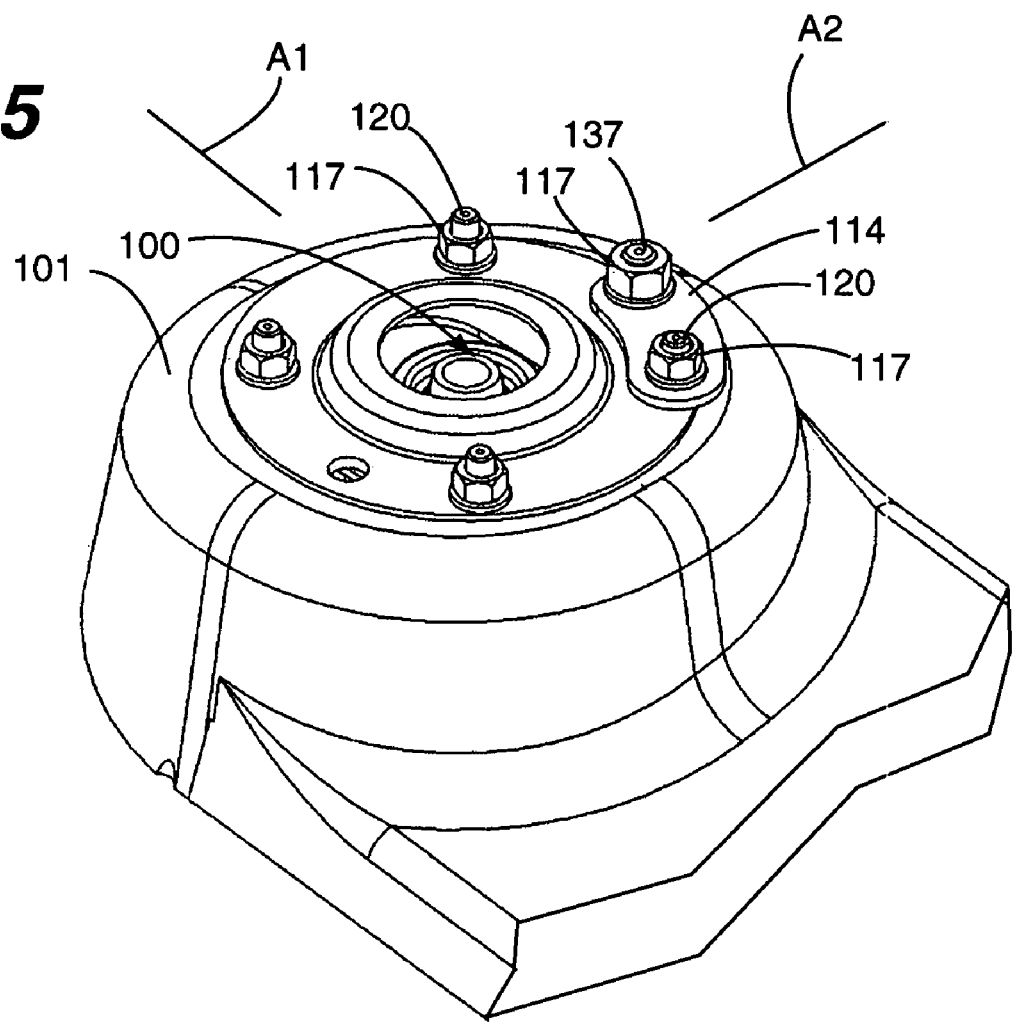
FIG. 5 shows the caster-camber plate assembly shown in FIG. 1 as mounted on a chassis strut tower of a vehicle.

Referring to FIG. 5, loosening the nuts 117 allows the camber plate 108 and the caster plate 112 to translate along their respective translation axes A1, A2. By manipulating the coil spring-strut assembly and/or attached components(s), caster is first adjusted through sliding of the caster plate 112. Once the desired caster setting is achieved, the nut 117 on the caster plate fastening stud 137 is tightened such that the caster plate 112 is secured against the chassis strut tower 101 in the position corresponding to the desired caster setting. Thereafter, the coil spring-strut assembly or attached components(s) are manipulated for adjusting the camber. Once the desired camber setting is achieved, the nuts 117 on the threaded studs 120 of the fastener plates 106 are tightened such that the camber plate 108 is secured in the position corresponding to the desired camber setting. Thus, it can be seen that caster-camber plates in accordance with the present invention provide for independent adjustment of camber and caster.

A support member 114 is engaged between the caster plate fastening stud 137 and one of the threaded studs 120 of the fastening plate 106. As shown in FIG. 4, the support member 114 includes apertures 142 through which the caster plate fastening stud 137 and the threaded stud 120 extend. One or both of the apertures 142 of the support member 114 is slotted or otherwise oversized to allow for offset variation between the caster plate fastening stud 137 and the threaded stud(s) 120 resulting from translation of the caster plate relative to the fastener plate(s) 106. The support member 114 serves to distribute clamping force loadings into chassis strut tower 101 upon tightening of the nut 117 on the caster plate fastening stud 137 and the nut 117 on the respective threaded stud 120 extending through the support member 114. It is disclosed herein that the support member 114 may be omitted with an oversized washer being used in its place.

In one embodiment (shown in FIGS. 1 and 3), the first translation axis A1 corresponds to camber adjustment and the second translation axis A2 corresponds to caster adjustment. In other embodiments, the caster camber plate assembly 100 is rotated 90 degrees relative to the vehicle chassis whereby the first translation axis A1 corresponds to caster adjustment and the second translation axis A2 corresponds to camber adjustment. In such a rotated configuration, the camber plate 108 becomes a caster plate (i.e., facilitates caster adjustment) and the caster plate 112 becomes the camber plate (i.e., facilitates camber adjustment).

Referring to FIGS. 2-4, the spring perch component group 104 is engaged with the bearing cup body 110. A bearing 145 is secured in the bearing pocket 132 of the bearing cup body 110. Spherical bearings, a plastic thrust bearing, polyurethane bushings and rubber bushings are examples of the bearing 145 and more generally are examples of strut top mounting members. In one embodiment (shown in FIG. 3), a locking element engages a mating feature 133 (e.g., retention device groove) for securing the bearing 145 in the bearing pocket 132. Bearing inserts 146 (FIGS. 1, 3 and 4) are preferably, but not necessarily, mounted on opposing sides of the bearing 145. Strut shaft spacers 148 may be positioned above and/or below the bearing inserts 146 for accommodating various strut shaft dimensions and extensions as well as compensating for various effective strut shaft lengths.

A thrust bearing 150 is engaged between the bearing cup body 110 and the spring perch 152 thereby coupling the spring perch 152 to the bearing cup body 110. In certain applications (e.g., coil spring non-rotating with respect to the bearing cup 110), the thrust bearing 150 advantageously provides for relative angular displacement between the spring perch 152 and the bearing cup 110. An exemplary embodiment of the thrust bearing 150 includes a first structure that fixedly engages the bearing cup 110, a second structure that fixedly engages the spring perch 152 and a central structure that is disposed between the first and second structures for promoting smooth, controlled angular displacement therebetween. Such a thrust bearing is commercially available from any number of sources. Preferably, but not necessarily, the first structure of the thrust bearing 150 includes a feature (e.g., a raised lip) that acts as a radial restraint when engaged with a mating portion of the bearing cup 110 and the second structure includes a feature (e.g., circumferential edge) that acts as a radial restraint when engaged with a meting portion of the spring perch 152. It is disclosed herein that, in other embodiments not shown (e.g., coil rotates in unison with the bearing cup 110), the thrust bearing 150 can be replaced with an adapter, that has the same overall external shape as the thrust bearing, but which does not provide any type of rotational bearing functionality.

A central axis C1 of the bearing cup body 110, a central axis C2 of the bearing 145 and a central axis C3 of the spring perch 152 are effectively aligned. The central axes of the bearing cup body 110, the bearing 145 and the spring perch 152 extend approximately perpendicular to the first and/or second translation axes A1, A2. Through engagement of a strut shaft with the bearing 145 (directly, through the bearing inserts 146 and through strut shaft spacers 148), the caster-camber plate assembly 100 secures the strut to the chassis strut tower 101 to allow damping and steering function. Through engagement of a suspension coil spring with the spring perch 152 (either directly or through a spring isolator), the caster-camber plate assembly 100 facilitates suspension support loads to be exerted between coil spring and the chassis strut tower 101 via the caster-camber plate assembly 100.

In view of the disclosures made herein, it can be seen that caster-camber plates in accordance with the present invention offer a number of advantageous aspects relative to conventional strut top mounting assemblies and competitive caster-camber plate assemblies. One such advantage is independent caster and camber adjustability. Another advantage is offering the most compact height while maintaining a high degree of structural stiffness. Another advantage is allowing original equipment upper spring perch isolators to be reused. Another advantage is not altering the ride height of the vehicle when installed with stock style springs. Another advantage is allowing stock strut mounting plate fasteners to be reused. Another advantage is that the camber plate is positioned below the strut tower to aid the available camber range. Another advantage is not requiring the use of any tools below the strut tower top to adjust the caster or camber. Another advantage is maintaining stock suspension travel range in combination with accommodating various bump travel ranges by changing position of the strut shaft spacers. Another advantage is accommodating many different styles of commercially available strut tower braces. Another advantage is allowing retention of the original equipment dust boots and/or bumpstops. Another advantage is requiring no modification to the strut tower top for installation. Another advantage is strengthening the strut tower in combination with spreading increased suspension loadings that are often seen with aftermarket springs and/or struts.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

The invention claimed is:

1. A caster-camber plate assembly, comprising:
a plurality of chassis fastening members each engaged with and extending from a first side face of at least one fastener plate;
a lower adjustment plate having a first side face thereof positioned adjacent the first side face of said at least one fastener plate such that said chassis fastening members extend therethrough, wherein the lower adjustment plate is moveable with respect to the fastener plate along a first translation axis and a second translation axis, and wherein the second translation axis extends in a substantially non-parallel manner with respect to the first translation axis;
a first plate interlocking structure integral with the lower adjustment plate, wherein the first plate interlocking structure includes a central bore configured for having a portion of a bearing assembly exposed therein;
an upper adjustment plate having a first side face thereof positioned adjacent a second side face of the lower adjustment plate such that said chassis fastening members extend therethrough, wherein the upper adjustment plate and the lower adjustment plate are jointly configured for allowing the upper adjustment plate to be moveable with respect to the fastener plate along the second translation axis;

a second plate interlocking structure integral with the upper adjustment plate, wherein the second plate interlocking structure engages the first plate interlocking structure for allowing relative movement between said adjustment plates along the first translation axis and for effectively inhibiting relative movement between said adjustment plates along the second translation axis and a spring perch component group mounted directly on the first plate interlocking structure, wherein the spring perch component group includes a strut top mounting bearing, a thrust bearing and a spring perch, wherein the strut top mounting bearing is mounted within a bore of a portion of the first plate interlocking structure extending below a second side face of the fastener plate, wherein the spring perch is coupled to the first plate interlocking structure, wherein the thrust bearing is coupled between only the spring perch and the first plate interlocking structure, wherein the spring perch is mounted entirely on the first plate interlocking structure such that all forces exerted on the spring perch by a coil spring engaged therewith are transmitted through the thrust bearing to the first plate interlocking structure and wherein a central axis of said first plate interlocking structure central bore, a central axis of the strut top mounting bearing and a central axis of the spring perch are effectively aligned.

2. The caster-camber plate assembly of claim 1 wherein the upper adjustment plate includes an upper adjustment plate fastening member integral therewith and extending from a second side face thereof.

3. The caster-camber plate assembly of claim 1 wherein the upper adjustment plate is effectively constrained to movement with respect to the fastener plate along the second translation axis.

4. The caster-camber plate assembly of claim 3 wherein:
the lower adjustment plate has a plurality of slot-shaped apertures extending therethrough;
the upper adjustment plate has a plurality of slot-shaped apertures extending therethrough;
a longitudinal axis of each one of said slots of the lower adjustment plate extends generally parallel with the first translation axis;
a longitudinal axis of each one of said slots of the upper adjustment plate extends generally parallel with the second translation axis;
said slots of said plates are aligned such that each one of said chassis fastening members extends through respective aligned ones of said slots; and
a width of each one of said slots of the lower adjustment plate is configured for accommodating translation of the upper adjustment plate with respect to said chassis fastening members.

5. The caster-camber plate assembly of claim 1 wherein:
the first plate interlocking structure protrudes above the second side face of the lower adjustment plate; and
the protruding portion of the first plate interlocking structure is constrained between opposing edge portions of the second plate interlocking structure for allowing relative movement between said adjustment plates along the first translation axis and for effectively inhibiting relative movement between said adjustment plates along the second translation axis.

6. The caster-camber plate assembly of claim 5 wherein:
the first plate interlocking structure includes a shoulder protruding above the second side face of the lower adjustment plate; and
the second plate interlocking structure includes an elongated slot having opposing edge portions; and
the protruding portion of the first plate interlocking structure is constrained between said opposing edge portions of the second plate interlocking structure.

7. The caster-camber plate assembly of claim 6 wherein the upper adjustment plate includes an upper adjustment plate fastening member integral therewith and extending from a second side face thereof.

8. The caster-camber plate assembly of claim 7, further comprising:
a bearing cup body fixedly engaged with the lower adjustment plate; and
the first interlocking structure is an integral portion of the bearing cup body, wherein a central bore of the bearing cup body defines the central bore of the first interlocking structure.

9. The caster-camber plate assembly of claim 8 wherein:
the lower adjustment plate has a plurality of slot-shaped apertures extending therethrough;
the upper adjustment plate has a plurality of slot-shaped apertures extending therethrough;
a longitudinal axis of each one of said slots of the lower adjustment plate extends generally parallel with the first translation axis;
a longitudinal axis of each one of said slots of the upper adjustment plate extends generally parallel with the second translation axis;
said slots of said plates are aligned such that each one of said chassis fastening members extends through respective aligned ones of said slots; and
a width of each one of said slots of the lower adjustment plate is configured for accommodating translation of the upper adjustment plate with respect to said chassis fastening members.

10. The caster-camber plate assembly of claim 9 wherein the width of each one of said slots of the lower adjustment plate is approximately equal to an effective travel length of said slots of the upper adjustment plate.

11. A caster-camber plate assembly, comprising:
a fastener plate including a plurality of chassis fastening members fixedly engaged therewith and extending from a first side face thereof;
a lower adjustment plate having a first side face thereof positioned adjacent the side face of the fastener plate such that said chassis fastening members extend therethrough, wherein the lower adjustment plate is moveable with respect to the fastener plate along a first translation axis and a second translation axis, and wherein the second translation axis extends substantially perpendicular to the first translation axis;
a bearing cup body fixedly engaged with the lower adjustment plate, wherein a shoulder of the bearing cup body protrudes above a second side face of the lower adjustment plate;
an upper adjustment plate having a first side face thereof positioned adjacent the second side face of the lower adjustment plate such that said chassis fastening members extend therethrough, wherein the upper adjustment plate is effectively constrained to movement with respect to the fastener plate along the second translation axis, wherein the upper adjustment plate includes an elongated aperture extending therethrough, wherein the upper adjustment plate and the lower adjustment plate are jointly configured for allowing the upper adjustment plate to be moveable with respect to the fastener plate along the second translation axis, wherein the protruding portion of the bearing cup body is constrained between opposing edge portions of the elongated aperture for allowing relative movement between said adjustment plates along the first translation axis and for effectively inhibiting relative movement between said adjustment plates along the second translation axis;

an upper adjustment plate fastening member integral with and extending from a second side face of the upper adjustment plate;

a support member engaged between the upper adjustment plate fastening member and at least one of said chassis fastening members; and a spring perch component group mounted directly on the bearing cup body, wherein the spring perch component group includes a strut top mounting bearing, a thrust bearing and a spring perch, wherein the strut top mounting bearing is mounted within a bore of a portion of the bearing cup body extending below a second side face of the fastener plate, wherein the spring perch is coupled to the bearing cup body, wherein the thrust bearing is coupled between only the spring perch and the bearing cup body, wherein the spring perch is mounted entirely on the bearing cup body such that all forces exerted on the spring perch by a coil spring engaged therewith are transmitted through the thrust bearing to the bearing cup body and wherein a central axis of the bearing cup body, a central axis of the strut top mounting bearing and a central axis of the spring perch are effectively aligned.

12. The caster-camber plate assembly of claim 11 wherein:
the lower adjustment plate has a plurality of slot-shaped apertures extending therethrough;
the upper adjustment plate has a plurality of slot-shaped apertures extending therethrough;
a longitudinal axis of each one of said slots of the lower adjustment plate extends generally parallel with the first translation axis;
a longitudinal axis of each one of said slots of the upper adjustment plate extends generally parallel with the second translation axis;
said slots of said plates are aligned such that each one of said chassis fastening members extends through respective aligned ones of said slots; and
a width of each one of said slots of the lower adjustment plate is configured for accommodating translation of the upper adjustment plate with respect to said chassis fastening members.

13. The caster-camber plate assembly of claim 12 wherein the width of each one of said slots of the lower adjustment plate is approximately equal to an effective travel length of said slots of the upper adjustment plate.

14. The caster-camber plate assembly of claim 11 wherein:
the support member includes a first aperture therein through which one of said chassis fastening members extends and a second aperture therein through which said upper adjustment plate fastening member extends; and
at least one of said apertures is a slotted aperture.

15. A caster-camber plate assembly kit, comprising:
a backing plate;
a plurality of chassis fastening members, wherein each one of said chassis fastening members is one of fixedly attached to the backing plate and engagable with the backing plate, wherein said chassis fastening members extend from a first side face of the backing plate when attached thereto or engaged therewith;

a lower adjustment plate having a first side face thereof configured for being positioned adjacent the side face of the fastener plate such that said chassis fastening members extend therethrough when the first side face of the lower adjustment plate is positioned adjacent the side face of the fastener plate, wherein the lower adjustment plate is configured for being moveable with respect to the fastener plate along a first translation axis and a second translation axis when positioned adjacent the side face of the fastener plate with said chassis fastening members extending therethrough, and wherein the second translation axis extends in a non-parallel manner with respect to the first translation axis;

a bearing cup body that is one of fixedly engagable with and fixedly engaged with the lower adjustment plate, wherein a shoulder of the bearing cup body protrudes above a second side face of the lower adjustment plate when the bearing cup body is fixedly engaged with the lower adjustment plate;

an upper adjustment plate having a first side face thereof configured for being positioned adjacent the second side face of the lower adjustment plate and for having said chassis fastening members extending therethrough when the first side face of the upper adjustment plate is positioned adjacent the second side face of the lower adjustment plate, wherein the upper adjustment plate is effectively constrained to movement with respect to the fastener plate along the second translation axis when the first side face of the upper adjustment plate is positioned adjacent the second side face of the lower adjustment plate, wherein the upper adjustment plate and the lower adjustment plate are jointly configured for allowing the upper adjustment plate to be moveable with respect to the fastener plate along the second translation axis, wherein the upper adjustment plate includes an elongated aperture, and wherein the protruding portion of the bearing cup body and opposing edge portions of the elongated aperture are jointly configured for constraining the protruding portion of the bearing cup body between said opposing edge portions of the elongated aperture for allowing relative movement between said adjustment plates along the first translation axis and for effectively inhibiting relative movement between said adjustment plates along the second translation axis; and a spring perch component group mounted directly on the bearing cup body, wherein the spring perch component group includes a strut top mounting bearing, a thrust bearing and a spring perch, wherein the strut top mounting bearing is mounted within a bore of a portion of the bearing cup body extending below a second side face of the fastener plate, wherein the spring perch is coupled to the bearing cup body, wherein the thrust bearing is coupled between only the spring perch and the bearing cup body, wherein the thrust bearing is coupled between only the spring perch and the bearing cup body, wherein the spring perch is mounted entirely on the bearing cup body such that all forces exerted on the spring perch by a coil spring engaged therewith are transmitted through the thrust bearing to the bearing cup body and wherein a central axis of the bearing cup body, a central axis of the strut top mounting bearing and a central axis of the spring perch are effectively aligned.

16. The caster-camber plate assembly of claim 15 wherein the upper adjustment plate includes an upper adjustment plate fastening member integral therewith and extending from a second side face thereof.

17. The caster-camber plate assembly of claim 15 wherein:
- the lower adjustment plate has a plurality of slot-shaped apertures extending therethrough;
- the upper adjustment plate has a plurality of slot-shaped apertures extending therethrough;
- a longitudinal axis of each one of said slots of the lower adjustment plate extends generally parallel with the first translation axis;
- a longitudinal axis of each one of said slots of the upper adjustment plate extends generally parallel with the second translation axis;
- said slots of said plates are aligned such that each one of said chassis fastening members extends through respective aligned ones of said slots; and
- a width of each one of said slots of the lower adjustment plate is configured for accommodating translation of the upper adjustment plate with respect to said chassis fastening members.

\* \* \* \* \*